Aug. 19, 1969  J. B. NEMEC  3,461,976

PORTABLE TOOL STABILIZER

Filed Dec. 15, 1967

*INVENTOR.*
JOHN B. NEMEC

BY

ATTORNEY 3,461,976
PORTABLE TOOL STABILIZER
John B. Nemec, 28740 U.S. Federal Highway,
Homestead, Fla. 33030
Filed Dec. 15, 1967, Ser. No. 691,003
Int. Cl. B23d 79/10
U.S. Cl. 173—163                                        4 Claims

ABSTRACT OF THE DISCLOSURE

A portable hand tool stabilizer attachment for supporting and stabilizing one end of a tool mounting shaft having a rotatable tool mounted between the ends of the shaft while a portable power unit supports the other end of the shaft and rotates the tool. The stabilizer includes a handle, and a bearing connected to the handle for allowing the tool mounting shaft to rotate freely therein.

BACKGROUND OF THE INVENTION

This invention relates to a new and improved stabilizing means for a tool rotated by a portable power unit, and, more particularly, to a gripping handle for supporting one end of a tool mounting shaft along the axis of the tool and opposite the end supported by the portable power unit.

As is perhaps well-known, it is difficult when using an ordinary portable power tool to perform close-accurate work, such as, removing unwanted burrs from metal items and other materials. Various unsuccessful techniques have been employed by persons operating portable power units to perform accurate work. Many ordinary portable power units provide only a single handle for supporting and stabilizing the tool connected to one end of the power unit. When a single handle is employed, it is extremely difficult for an operator to stabilize the tool connected at the far end of the power unit. When in use, the tool will tend to wobble or walk over the workpiece. In the past, two handles have been connected to one end of portable power units to provide additional stability, but the use of a plurality of hands does not prevent the tool from walking over the workpiece.

SUMMARY OF THE INVENTION

The present invention relates to a new and improved stabilizing device for use with portable power units in order to support and stabilize a tool connected to a tool mounting shaft held between the power unit and the stabilizer. The stabilizer includes a handle and a bearing means for rotatably connecting one end of the tool mounting shaft to the stabilizer. In the preferred embodiment of the invention the axis of the stabilizing handle lies parallel to the axis of the tool mounting shaft.

It is an object of this invention to provide an improved stabilizer means for use with portable power units in order to perform close-accurate work with the units.

Another object of this invention is to provide a stabilizer means that can be connected adjacent one end of the tool mounting shaft opposite the end supported by the portable power unit.

A further object of this invention is to provide a stabilizer means in line with the axis of the tool mounting shaft.

An additional object of this invention is to provide a non-complex, low cost means for converting an ordinary portable power unit into a controllable instrument.

In accordance with these and other objects which will be apparent hereinafter, the instant invention will now be described with particular reference to the accompanying drawing illustrating the preferred embodiments of this invention.

DESCRIPTION OF THE PREFERRED EMBODIMENT

Figure 1:
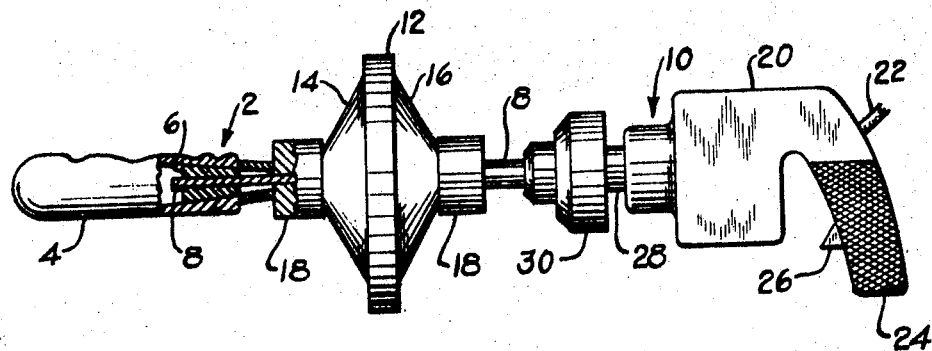
FIGURE 1, is a side view partially in cross-section of the stabilizer and portable power unit connected adjacent opposite ends of the tool mounting shaft.

Referring now in detail to the drawing wherein embodiments of the invention are shown, and referring particularly to FIGURE 1, the stabilizer, generally designated as numeral 2, includes a handle 4, a bearing means 6 connected within the handle 4, and a tool mounting shaft 8 having one end rotatably mounted in the bearing 6. The axis of the tool mounting shaft 8 lies in the axis of the drive shaft (not shown) of portable power unit 10. The other end of the tool mounting shaft 8 is connected to the portable power drive unit 10, shown as a portable electric hand drill. A tool 12, shown as an abrasive wheel, is connected to the tool mounting shaft 8 midway between its ends. The tool 12 is connected to the tool mounting shaft 8 between spaces 14 and 16, and locking nuts 18. The tool 12 is secured to the tool mounting shaft 8 by locking the tool between the locking nuts 18.

The portable power unit 10 includes a casing 20 having an electric motor (not shown) therein that is connected to an electrical power source by wires 22. The portable power unit 10 also includes a gun-type handle 24 for supporting the tool 12. The handle includes an electrical trigger switch 26 connected to the wires 22 between the motor and the power source. The electrical motor drives the power unit shaft 28 and the clamping device 30 attached thereto. The clamping device 30 has adjustable jaws therein to connect to the portable power unit 10 a tool mounting shaft.

The stabilizer 2, when connected to the portable power unit 10, allows an operator to support both ends of the tool axis. The stabilizer 2 therefore allows the operator to prevent the tool from wobbling or walking on a workpiece. The non-complex stabilizer provides a means for converting an ordinary portable power unit into a controllable precision type instrument.

Figure 3:
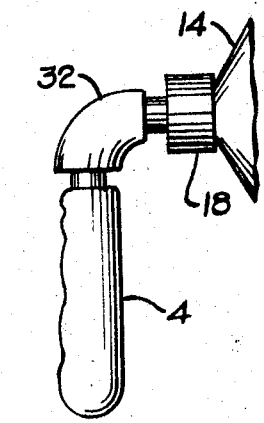
FIGURE 3, is a side view of another embodiment of the stabilizer.

Now referring to FIGURE 3, the stabilizer 2 has a handle 4 at right angles to the axis of the tool mounting shaft 8. This embodiment of the stabilizer is useful when the tool must be inserted into narrow quarters. The handle is attached to an elbow 32. A bearing, similar to that shown in FIGURE 1 for supporting the rotatable tool-mounting shaft 8, is connected to the elbow 32.

Figure 2:
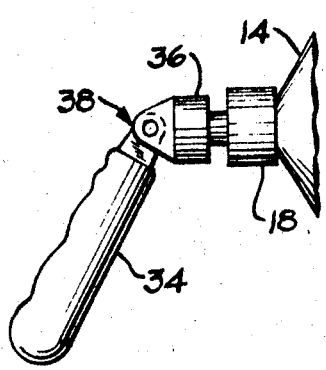
FIGURE 2, is a side view of an additional embodiment of the stabilizer.

An adjustable handle 34, as shown in FIGURE 2, may be provided in order to vary the angle between the axis of the tool mounting shaft 8 and the handle. A member 36 is provided with a bearing similar to bearing 6 in FIGURE 1, in order to rotatably connect the tool mounting shaft 8 to the stabilizer. An adjustable connection 38, shown as a pin-clamping means, is provided to allow adjustment of the handle angle. The handle may be clamped into various positions from 0 degrees to 90 degrees in relation to the axis of the tool mounting shaft.

In use, the tool, locking nuts and spacers are connected to the tool mounting shaft. The locking nuts are adjusted to place the tool in the desired position between the ends of the tool mounting shaft. The stabilizer with the tool mounted thereon is placed into the jaws of the portable power unit and connected thereto. The portable power unit is plugged into an electrical power source. One hand of the operator is placed on the gun-type handle of the portable power unit and the operator's other hand is placed on the stabilizer handle. The finger-gripping means on the stabilizer handle provides a better gripping surface. Therefore, the tool is supported adjacent both ends of the tool mounting shaft for performing accurate work.

The instant invention has been shown and described herein in what is considered the most practical and preferred embodiment. It is recognized, however, that departures may be made therefrom within the scope of the invention. The invention is therefore not to be limited to the details disclosed herein but to be accorded the full scope of the claims so as to embrace any and all equivalent apparatus and articles.

What is claimed is:

1. A portable hand tool stabilizer for use with a portable power unit for stabilizing a tool held between the stabilizer and the power unit comprising:
    a handle,
    a tool mounting shaft having one end rotatably connected to said handle, and
    a tool mounting means on said mounting shaft for connecting a tool between the ends of said mounting shaft, whereby the other end of said mounting shaft is connected to the power unit for support and for rotating the tool.

2. A portable hand tool stabilizer as set forth in claim 1, wherein:
    said handle includes a bearing for rotatably connecting said mounting shaft to said handle.

3. A portable hand tool stabilizer as set forth in claim 2, wherein:
    said handle is adjustable for placing the center line of said handle at an angle to the axis of said mounting shaft.

4. A portable hand tool stabilizer as set forth in claim 3, wherein:
    the center line of the bearing is contiguous with the axis of said mounting shaft, whereby the tool is stabilized for performing accurate work.

References Cited

UNITED STATES PATENTS

| | | | |
|---|---|---|---|
| 1,024,151 | 4/1912 | Smith | 173—163 X |
| 1,229,694 | 6/1917 | Winter | 173—163 X |
| 1,503,508 | 8/1924 | Kraber | 173—163 X |
| 1,781,130 | 11/1930 | Shaff | 173—163 X |

OTHER REFERENCES

Catalog Number 30, The Buckeye Portable Tool Co., p. 31, copyright 1930.

NILE C. BYERS, JR., Primary Examiner